(12) United States Patent
Lee et al.

(10) Patent No.: US 11,722,983 B2
(45) Date of Patent: Aug. 8, 2023

(54) ELECTRONIC DEVICE FOR PERFORMING POSITIONING AND METHOD THEREOF

(71) Applicant: Samsung Electronics Co., Ltd., Gyeonggi-do (KR)

(72) Inventors: Muyeol Lee, Gyeonggi-do (KR); Seunghoon Kim, Gyeonggi-do (KR); Jongyeon Kim, Gyeonggi-do (KR); Hyunsuk Choi, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 49 days.

(21) Appl. No.: 17/345,468

(22) Filed: Jun. 11, 2021

(65) Prior Publication Data

US 2021/0400614 A1 Dec. 23, 2021

(30) Foreign Application Priority Data

Jun. 17, 2020 (KR) .................. 10-2020-0073486

(51) Int. Cl.
*H04W 64/00* (2009.01)
*H01Q 9/04* (2006.01)

(52) U.S. Cl.
CPC .......... *H04W 64/00* (2013.01); *H01Q 9/0407* (2013.01)

(58) Field of Classification Search
CPC ..................... H04W 64/00; H01Q 9/0407
See application file for complete search history.

(56) References Cited

U.S. PATENT DOCUMENTS 6,392,610 B1    5/2002  Braun et al.
8,611,394 B2   12/2013  Sugino et al.
8,681,048 B2    3/2014  Nishida
9,140,772 B1    9/2015  Dewberry et al.
9,226,175 B2 * 12/2015  Nimmala ............. H04B 7/0877
(Continued)

FOREIGN PATENT DOCUMENTS

WO    WO-02063783 A2 *  8/2002  ............. H01Q 1/241
WO    WO 2020/050495      3/2020

OTHER PUBLICATIONS

International Search Report dated Oct. 5, 2021 issued in counterpart application No. PCT/KR2021/007403, 8 pages.

*Primary Examiner* — Muthuswamy G Manoharan
(74) *Attorney, Agent, or Firm* — The Farrell Law Firm, P.C.

(57) ABSTRACT

An electronic device includes a plurality of first antennas, a second antenna, and at least one processor. The at least one processor transmits a first positioning signal using one of the plurality of first antennas or the second antenna, receives a first reception signal for the first positioning signal using at least one of the plurality of first antennas, transmits a second positioning signal using one of the plurality of first antennas or the second antenna, when an intensity of the first reception signal is less than a threshold, receives a second reception signal for the second positioning signal using at least one of the plurality of first antennas and identifies an arrival time point based on the second reception signal, receives the second reception signal for the second positioning signal using the second antenna and corrects the identified arrival time point based on the second reception signal received using the second antenna, and determines the corrected arrival time point as an arrival time point of the second reception signal.

16 Claims, 16 Drawing Sheets

(56) References Cited

U.S. PATENT DOCUMENTS

| | | |
|---|---|---|
| 9,383,436 B2 | 7/2016 | Dewberry et al. |
| 10,290,948 B2 | 5/2019 | Hoffman et al. |
| 10,333,606 B2 | 6/2019 | Nishimori et al. |
| 10,509,116 B2 | 12/2019 | McLaughlin et al. |
| 10,566,699 B2 | 2/2020 | Hoffman et al. |
| 10,785,650 B2 | 9/2020 | Dutz et al. |
| 10,854,990 B2 | 12/2020 | Hoffman et al. |
| 10,903,566 B2 | 1/2021 | Di Nallo et al. |
| 10,917,870 B2 | 2/2021 | Pan et al. |
| 11,095,017 B2 | 8/2021 | Cooper et al. |
| 11,215,704 B2 | 1/2022 | McLaughlin et al. |
| 2008/0297401 A1 | 12/2008 | Nishida |
| 2010/0060517 A1* | 3/2010 | Nichols .............. H01Q 21/0025 342/357.29 |
| 2011/0069738 A1 | 3/2011 | Sugino et al. |
| 2015/0029053 A1 | 1/2015 | Dewberry et al. |
| 2017/0227623 A1* | 8/2017 | Park ......................... G01S 3/46 |
| 2017/0302471 A1* | 10/2017 | Koenigsmark ......... H04L 69/08 |
| 2018/0076875 A1 | 3/2018 | Haverinen et al. |
| 2018/0175922 A1 | 6/2018 | Nishimori et al. |
| 2018/0254870 A1 | 9/2018 | Dutz et al. |
| 2019/0097317 A1 | 3/2019 | Di Nallo et al. |
| 2019/0331781 A1 | 10/2019 | McLaughlin et al. |
| 2019/0331782 A1 | 10/2019 | McLaughlin et al. |
| 2020/0021011 A1 | 1/2020 | Cooper et al. |
| 2020/0068523 A1 | 2/2020 | Pan et al. |
| 2020/0181772 A1 | 5/2020 | Hoffman et al. |
| 2021/0351494 A1 | 11/2021 | Cooper et al. |
| 2021/0392454 A1* | 12/2021 | Choi ....................... H04W 4/40 |
| 2022/0334237 A1 | 10/2022 | McLaughlin et al. |

* cited by examiner

| Ranging | | ANT0(metal) | ANT1 | ANT2 |
|---|---|---|---|---|
| FIRST POSITIONING | TX | | TX1 | |
| | RX | | RX1 | |
| SECOND POSITIONING | TX | | TX1 | |
| | RX | Assistance RX0 | RX1 | |

800a

| Ranging | | ANT0(metal) | ANT1 | ANT2 |
|---|---|---|---|---|
| FIRST POSITIONING | TX | | TX1 | |
| | RX | | RX1 | RX2 |
| SECOND POSITIONING | TX | | TX1 | |
| | RX | Assistance RX0 | RX1 | RX2 |

800b

| AoA | | ANT0(metal) | ANT1 | ANT2 |
|---|---|---|---|---|
| FIRST POSITIONING | TX | | TX1 | |
| | RX | | RX1 | RX2 |
| SECOND POSITIONING | TX | | TX1 | |
| | RX | Assistance RX0 | RX1 | RX2 |

| Ranging | | ANT0(metal) | ANT1 | ANT2 |
|---|---|---|---|---|
| FIRST POSITIONING | TX | TX0 | | |
| | RX | RX0 | | |
| SECOND POSITIONING | TX | TX0 | | |
| | RX | RX0 | Assistance RX1 | |

900a

| Ranging | | ANT0(metal) | ANT1 | ANT2 |
|---|---|---|---|---|
| FIRST POSITIONING | TX | TX0 | | |
| | RX | | RX1 | |
| SECOND POSITIONING | TX | TX0 | | |
| | RX | Assistance RX0 | RX1 | |

| AoA | | ANT0(metal) | ANT1 | ANT2 |
|---|---|---|---|---|
| FIRST POSITIONING | TX | TX0 | | |
| | RX | RX0 | | RX2 |
| SECOND POSITIONING | TX | TX0 | | |
| | RX | RX0 | Assistance RX1 | RX2 |

1000a

| AoA | | ANT0(metal) | ANT1 | ANT2 |
|---|---|---|---|---|
| FIRST POSITIONING | TX | TX0 | | |
| | RX | | RX1 | RX2 |
| SECOND POSITIONING | TX | TX0 | | |
| | RX | Assistance RX0 | RX1 | RX2 |

1000b

| AoA | | ANT0(metal) | ANT1 | ANT2 |
|---|---|---|---|---|
| FIRST POSITIONING | TX | | TX1 | |
| | RX | RX0 | | RX2 |
| SECOND POSITIONING | TX | | TX1 | |
| | RX | RX0 | Assistance RX1 | RX2 |

ELECTRONIC DEVICE FOR PERFORMING POSITIONING AND METHOD THEREOF

CROSS-REFERENCE TO RELATED APPLICATION(S)

This application is based on and claims priority under 35 U.S.C. § 119 to Korean Patent Application No. 10-2020-0073486, filed on Jun. 17, 2020, in the Korean Intellectual Property Office, the disclosure of which is incorporated by reference herein its entirety.

BACKGROUND

1. Field

The disclosure relates generally to an electronic device for performing positioning.

2. Description of Related Art

An electronic device may perform positioning based on an ultra-wideband (UWB) signal. For example, the UWB signal may have a frequency band of 500 megahertz (MHz) or more. Because the UWB signal has a similar characteristic to an impulse signal, its pulse width is shorter than a path delay. Thus, in positioning using the UWB signal, a direct signal and a reflected signal may be easily distinguished from each other. Based on the above-mentioned characteristics of the UWB signal, the electronic device may perform relatively accurate positioning (e.g., an error of less than 30 centimeter (cm)) using at least one antenna.

The electronic device may perform positioning based on various positioning algorithms (e.g., angle of arrival (AoA), a first time difference of arrival (TDoA), a second time difference of arrival (AoD), time of arrival (ToA), time of flight (ToF), and/or two way ranging (TWR)).

An electronic device may perform positioning using a UWB signal in various environments. However, in general, despite performing positioning for a short range, positioning using an antenna may not be performed or may be inaccurate in a situation where the intensity of the signal received by the electronic device is weak (e.g., a weak electric field environment). For example, in the weak electric field environment, the electronic device may not measure a distance from a positioning target. In addition, the distance from the positioning target may be measured closer or further than it really is.

SUMMARY

The present disclosure has been made to address the above-mentioned problems and disadvantages, and to provide at least the advantages described below.

In accordance with an aspect of the disclosure, an electronic device is provided that includes a plurality of first antennas, a second antenna, and at least one processor operatively connected with the plurality of first antennas and the second antenna. The at least one processor is configured to transmit a first positioning signal using one of the plurality of first antennas or the second antenna, receive a first reception signal for the first positioning signal using at least one of the plurality of first antennas, transmit a second positioning signal using one of the plurality of first antennas or the second antenna, when an intensity of the first reception signal is less than a threshold, receive a second reception signal for the second positioning signal using at least one of the plurality of first antennas and identify an arrival time point based on the second reception signal, receive the second reception signal for the second positioning signal using the second antenna and correct the identified arrival time point based on the second reception signal received using the second antenna, and determine the corrected arrival time point as an arrival time point of the second reception signal.

In accordance with another aspect of the disclosure, an operation method of an electronic device is provided that includes transmitting a first positioning signal using one of a plurality of first antennas or a second antenna, receiving a first reception signal for the first positioning signal using at least one of the plurality of first antennas, transmitting a second positioning signal using one of the plurality of first antennas or the second antenna, when an intensity of the first reception signal is less than a threshold, receiving a second reception signal for the second positioning signal using at least one of the plurality of first antennas and identifying an arrival time point based on the second reception signal, receiving the second reception signal for the second positioning signal using the second antenna and correcting the identified arrival time point based on the second reception signal received using the second antenna, and determining the corrected arrival time point as an arrival time point of the second reception signal.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 is a table illustrating an antenna operation, according to an embodiment;

FIG. 9 is a table illustrating an antenna operation upon ranging of an electronic device, according to an embodiment;

FIG. 10 is a table illustrating an antenna operation upon AoA measurement of an electronic device, according to an embodiment;

DETAILED DESCRIPTION

Figure 1:
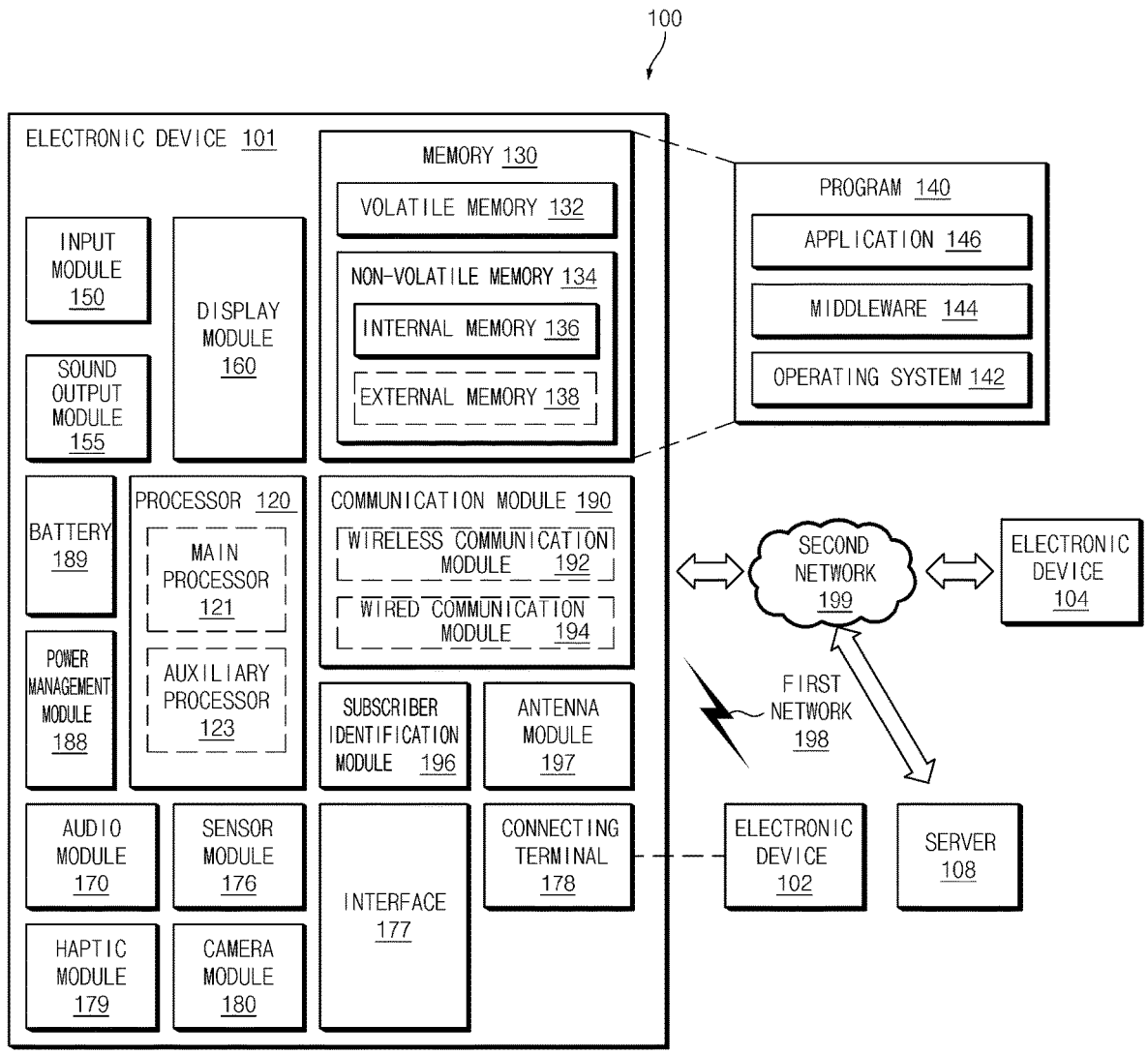
FIG. 1 is a block diagram illustrating an electronic device in a network environment, according to various embodiments.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
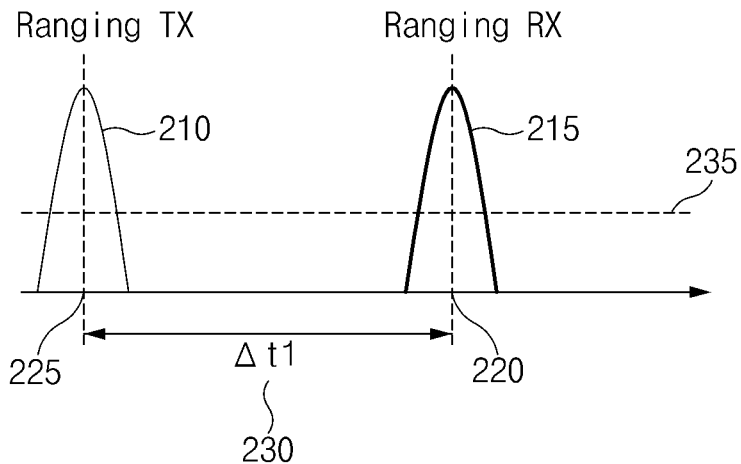
FIG. 2 illustrates positioning using an antenna of an electronic device in a strong electric field environment, according to an embodiment.
Figure 2:
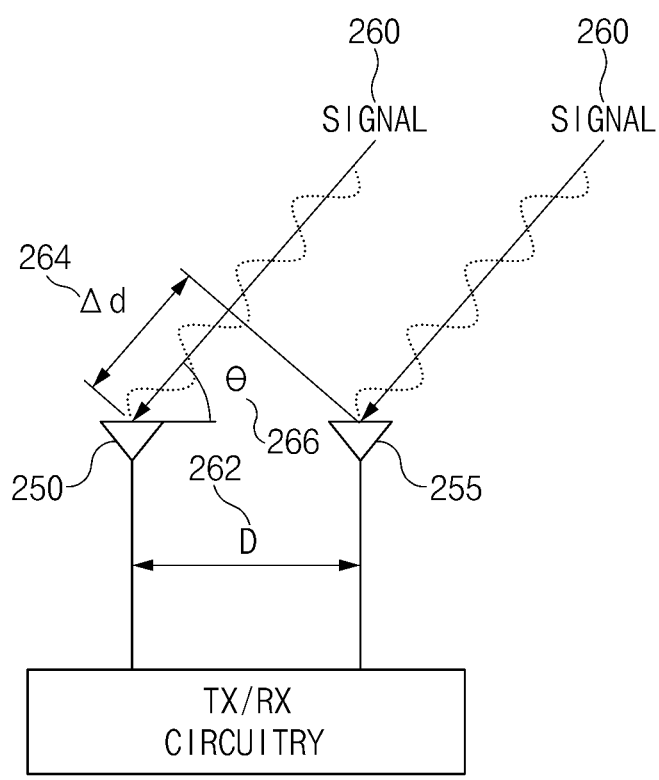

FIG. 2 illustrates positioning using an antenna of an electronic device in a strong electric field environment, according to an embodiment.

Referring to FIG. 2, positioning chart 200a illustrates ranging of an electronic device 101 in the strong electric field environment. Diagram 200b of FIG. 2 illustrates an angle of arrival (AoA) measurement of the electronic device 101 in the strong electric field environment. The ranging and AoA measurement of FIG. 2 may be performed by a processor 120 of the electronic device 101. A description of the processor may be referred to by the description of FIG. 4.

In positioning chart 200a, the processor may transmit a positioning signal 210 (e.g., a poll message) using an antenna. The positioning signal 210 may include information about a transmission time point 225 of the positioning signal 210. The processor may receive a signal 215 (e.g., a response message) for the positioning signal 210. The signal 215 for the positioning signal 210 may refer to, for example, a signal in which the positioning signal 210 is reflected from a positioning target or may refer to, for example, a response signal transmitted by an external object which receives the positioning signal 210. The "signal for the positioning signal" in the disclosure may be referred to as a "receive signal" or a "reception signal".

The processor may determine an arrival time point 220 of the receive signal 215. For example, the processor may set a threshold 235 for finding the arrival time point 220 of the receive signal 215. When the intensity of the receive signal 215 is greater than the threshold 235, the processor may search for a first path. In detail, the processor may determine a peak of the intensity of the receive signal 215 after the intensity of the receive signal 215 is greater than the threshold 235 as the first path. The processor may determine the first path of the receive signal 215 as the arrival time point 220 of the receive signal 215. The processor may calculate Δt1 230 which is a difference between the transmission time point 225 and the arrival time point 220 to measure a distance from the positioning target. The ranging using Δt1 230 may be calculated by using Equation (1), below.

Measured distance=(Δt1−delay time)*A/2   (1)

In Equation (1), the delay time may be a time taken for the positioning target to receive the positioning signal 210 and transmit (return) the signal 215 for the positioning signal 210. The receive signal 215 may include information about the delay time. In Equation (1), A may be understood as a constant about the speed of light or a propagation rate of radio waves.

In diagram 200b of FIG. 2, the processor may use two or more antennas to measure an AoA. The processor may receive a receive signal 260 for a positioning signal using a first antenna 250 and a second 255. The first antenna 250 and the second antenna 255 may be designed to be spaced apart from each other by a separation distance D 262. Information about the separation distance D 262 may be stored in a memory 130 of the electronic device 101. A time point when the first antenna 250 receives the receive signal 260 and a time point when the second antenna 255 receives the receive signal 260 may vary due to the separation distance D 262 between the first antenna 250 and the second 255. The processor may measure Δd 264 using the difference between the arrival time points of the receive signal 260 received using the first antenna 250 and the second antenna 255. The separation distance D 262 may be defined according to Equation (2) below, by Δd 264 and an AoA θ 266. A phase difference Δφ of the signals received by the first antenna 250 and the second antenna 255 may be calculated according to Equation (3) below, using Δd 264.

$$D = \Delta d * \cos(\theta) \quad (2)$$

$$\Delta \varphi = 2\pi/\lambda * \Delta d \quad (3)$$

The processor may calculate Equations (2) and (3) above to calculate the AoA θ 266 using the same method as that of Equation (4), below.

$$AoA(\theta) = \cos^{-1}\left(\frac{\Delta \varphi}{2\pi D/\lambda}\right) \quad (4)$$

Figure 3:
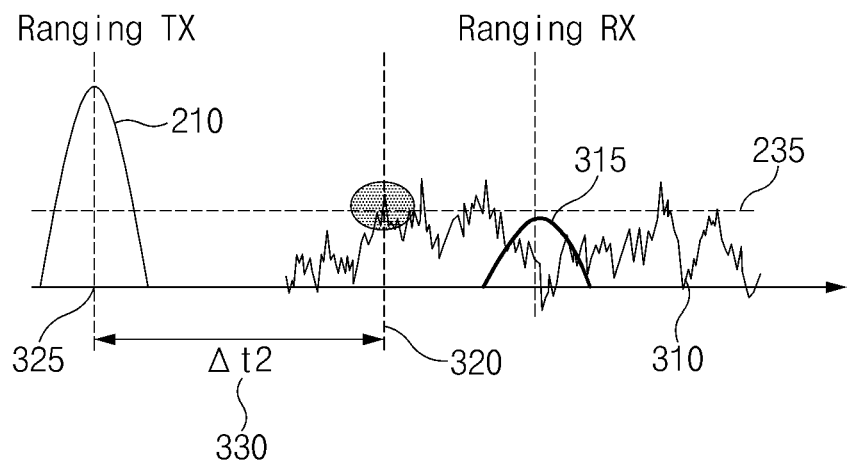
FIG. 3 illustrates positioning using an antenna of an electronic device in a weak electric field environment, according to an embodiment.
Figure 3:
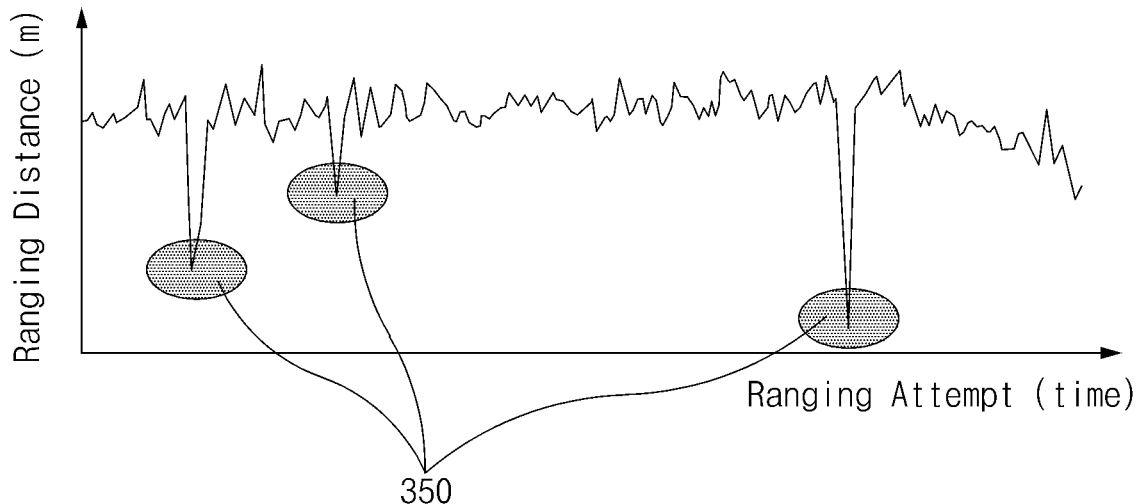

FIG. 3 illustrates positioning using an antenna of an electronic device in a weak electric field environment, according to an embodiment.

Referring to FIG. 3, positioning chart 300a of FIG. 3 illustrates a signal received by an antenna of an electronic device 101 in the weak electric field environment. Graph 300b of FIG. 3 illustrates the result of the ranging of the electronic device 101 in the weak electric field environment. The positioning of FIG. 3 may be performed by a processor 120 of the electronic device 101. A description of the processor may be referred to by the description of FIG. 4.

The weak electric field environment may be generated by various causes. For example, when a polarization characteristic of the antenna of the electronic device 101 and a polarization characteristic of an antenna of an external electronic device, which is a positioning target, are perpendicular to each other, because of transmitting and receiving a signal, the polarization characteristic of which is perpendicular, the antenna may correspond to the weak electric field situation. In this case, the positioning of the electronic device 101 for the external electronic device may be inaccurate or impossible. In addition, when there are many obstacles between the electronic device 101 and the positioning target, the electronic device 101 may perform positioning in a non-line of sight (NLOS) environment. In this case, because the obstacles interfere in the transmission and reception of a signal, the positioning of the electronic device 101 for the positioning target may be inaccurate or impossible. Additionally, when there is human body interference (e.g., when a user grips the electronic device 101 or when the electronic device 101 is located in a pocket or a bag), the weak electric field situation may exist. Because the intensity of the signal for the positioning signal received by the antenna of the electronic device 101 is weak in the weak electric field environment, the accuracy of positioning may be degraded.

A description of a ranging method using the antenna in positioning chart 300a in FIG. 3 may be referred to by the description of positioning chart 200a in FIG. 2. The description of FIG. 3 will focus mainly on the differences between positioning chart 300a and positioning chart 200a.

Referring again to FIG. 3, the processor may transmit a positioning signal 210 using the antenna. The positioning signal 210 may include information about a transmission time point 325 of the positioning signal 210. The processor may receive a signal 315 for the positioning signal 210. In this case, the processor may receive a noise signal 310 around the electronic device 101 together. The noise signal 310 may be generated by motion of a subject who wears the electronic device 101. Unlike positioning chart 200a of FIG. 2, it may be assumed that the electronic device 101 in positioning chart 300a is in the weak electric field environment. In the weak electric field environment, the intensity of a receive signal 315 may be relatively weaker than the noise signal 310. Thus, when the processor determines an arrival time point using the same method as that in positioning chart 200a of FIG. 2, a specific time point rather than an arrival time point of the real receive signal 315 may be determined as an arrival time point due to the noise signal 310. The intensity of the noise signal 310 may be greater than a threshold 235 at a time point in positioning chart 300a. The processor may find a peak of the intensity of the noise signal 310 after the intensity of the noise signal 310 is greater than the threshold 235 and may determine the peak as a first path. In this case, the processor may determine a specific time point 320 as an arrival time point.

When the processor determines the arrival time point of the receive signal 315 as the specific time point 320, a distance from a positioning target may be calculated based on Δt2 330. Because Δt2 330 is measured shorter than Δt1 230 of FIG. 2 in the weak electric field environment, the distance from the positioning target may be measured closer than it really is. Unlike FIG. 3, when Δt2 330 is measured longer than Δt1 230, the distance from the positioning target may be measured further than it really is.

Graph 300b of FIG. 3 illustrates the result of the ranging of the electronic device 101 in the weak electric field environment. When the arrival time point is incorrectly determined, such as in positioning chart 300a in the weak electric field environment, measurement values 350 may include a measurement error. For example, the distance from the positioning target may be measured to be generally consistent with most measurement values except for the measurement values 350, where the distance from the positioning target may be measured to be relatively close in the weak electric field environment. The description of the measurement values 350 in graph 300b is merely illustrative, and the distance from the positioning target may be measured to be relatively further in the weak electric field environment.

Figure 4:
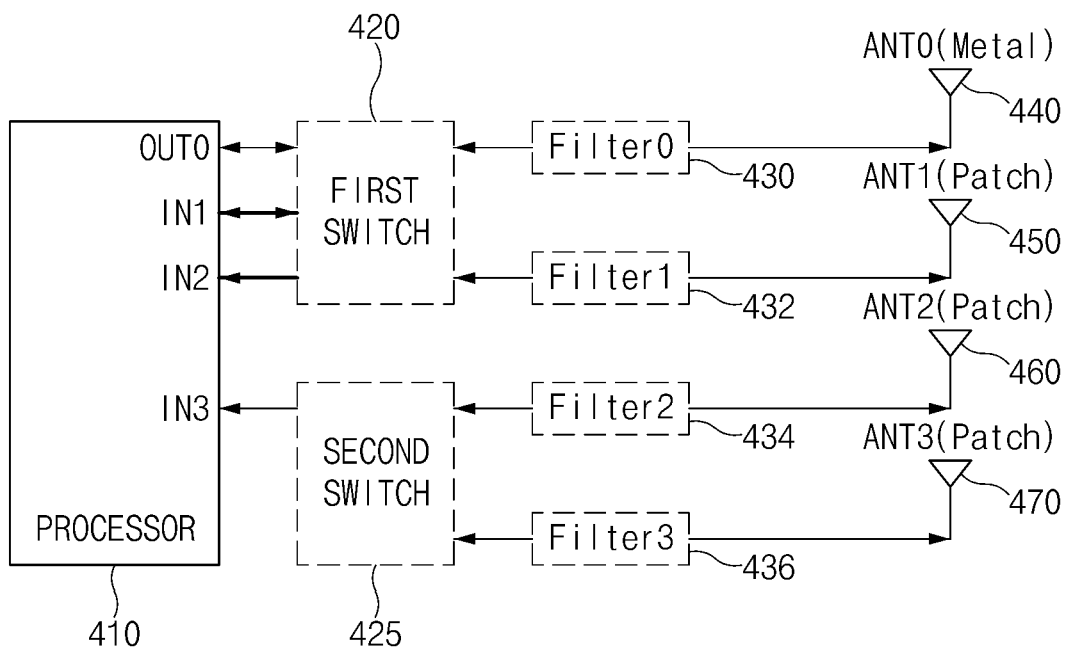
FIG. 4 is a block diagram illustrating a configuration of an electronic device which performs positioning, according to an embodiment.

FIG. 4 is a block diagram illustrating a configuration of an electronic device which performs positioning, according to an embodiment.

Referring to FIG. 4, an electronic device 400 which performs precise positioning includes a processor 410 and a plurality of antennas including a first antenna 440 (ANT0), a second antenna 450 (ANT1), a third antenna 460 (ANT2), and a fourth antenna 470 (ANT3). The configuration of the electronic device 400 shown in FIG. 4 is merely illustrative, and an embodiment of the disclosure is not limited thereto. For example, the electronic device 400 may not include some of a plurality of antennas or may include an additional antenna. For example, as shown in FIG. 4, the electronic device 400 includes a first switch 420, a second switch 425, a first filter 430, a second filter 432, a third filter 434, and a fourth filter 436. However, in separate embodiments, some or all of the aforementioned components may or may not be included in the electronic device 400. In addition, the electronic device 400 may also include a battery 189 or a communication module 190.

The processor 410 may execute, for example, software (e.g., a program 140 of FIG. 1) to control at least one other component (e.g., a hardware or software component) of the electronic device 400 connected to the processor 410 and may perform a variety of data processing and calculations. The processor 410 may include a main processor 121 (e.g., a CPU or an AP) or an auxiliary processor 123 (e.g., a CP) that may operate independently or together. The auxiliary processor 123 may be implemented independently of the main processor 121 or as a part thereof. The auxiliary processor 123 (e.g., the CP) may be implemented as a part of another component (e.g., the communication module 190) that is functionally associated with the auxiliary processor 123.

The first antenna 440, the second antenna 450, the third antenna 460, and the fourth antenna 470 may transmit a positioning signal and may receive a signal for the positioning signal. The first antenna 440, the second antenna 450, the third antenna 460, and the fourth antenna 470 may be designed as a patch antenna or a metal antenna. For example, the first antenna 440, the second antenna 450, and the third antenna 460 may be designed as a patch antenna. The fourth antenna 440 may be designed as a metal antenna.

The first filter 430, the second filter 432, the third filter 434, and the fourth filter 436 may be respectively connected with the first antenna 440, the second antenna 450, the third antenna 460, and the fourth antenna 470 to filter UWB signals received by the first antenna 440, the second antenna 450, the third antenna 460, and the fourth antenna 470 or filter signals delivered from the processor 410 to the first antenna 440, the second antenna 450, the third antenna 460, and the fourth antenna 470.

The first switch 420 may be referred to as double pole 3 throw (DP3T), and the second switch 425 may be referred to as single pole double throw (SPDT). The first switch 420 and the second switch 425 may turn on/off signal transmission between the processor 410 and the first antenna 440, the second antenna 450, the third antenna 460, and the fourth antenna 470. For example, when the processor 410 transmits and receives a signal with the first antenna 440, the first switch 420 may block other paths except for a path which connects the processor 410 with the first antenna 440. In detail, when the processor 410 transmits a positioning signal using the first antenna 440, the positioning signal may be delivered to the first switch 420 via a port OUT 0 of the processor 410. In this case, the first switch 420 may block other paths except for a path connected with the port OUT 0 such that the positioning signal is not interfered with by another signal. When the processor 410 transmits the signal for the positioning signal using the second antenna 450, the positioning signal may be filtered by the first filter 432 to be delivered to the first switch 420. The first switch 420 may deliver the transmitted signal to the processor 410 via a port IN 1 or IN 2 of the processor 410. In this case, the first switch 420 may block other paths except for a path connected with the port IN 1 or IN 2 such that the signal for the positioning signal is not interfered with by another signal. When the processor 410 receives a signal from the third antenna 460 or the fourth antenna 470, like the first switch 420, the second switch 425 may block other paths except for a path where the signal is delivered to prevent signal interference.

The processor 410 may use ANT 0440, which is a metal antenna, as an auxiliary antenna to improve accuracy of positioning. The processor 410 may correct an arrival time point of a UWB signal received using at least one of the first antenna 450, the second antenna 460, and/or the third antenna 470 using the auxiliary antenna. The method for increasing the accuracy of the positioning according to an embodiment will be described in detail with reference to FIG. 5A.

Figure 5A:
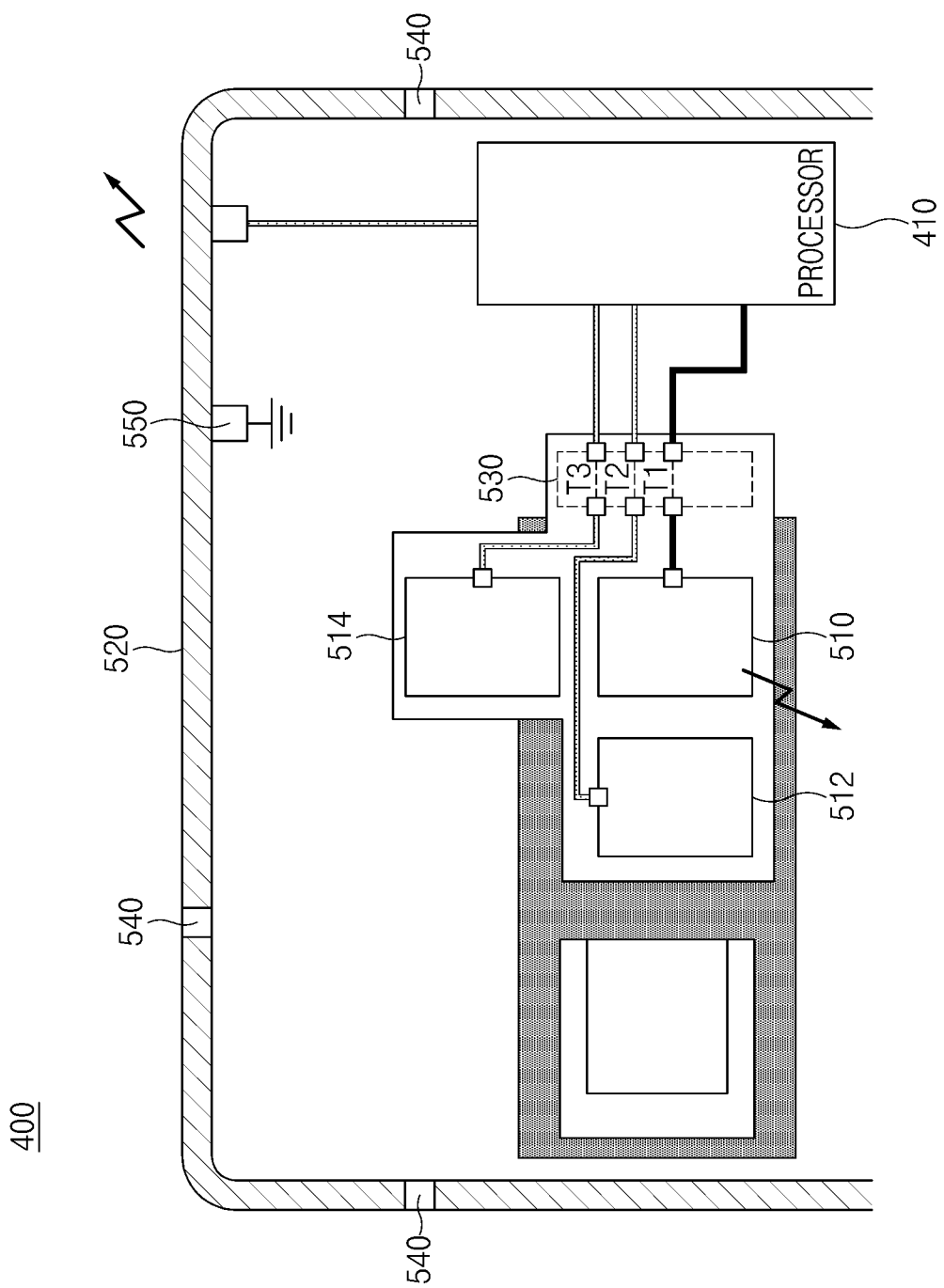
FIG. 5A illustrates a structure of an electronic device, according to an embodiment.

FIG. 5A illustrates a structure of an electronic device, according to an embodiment.

Figure 5B:
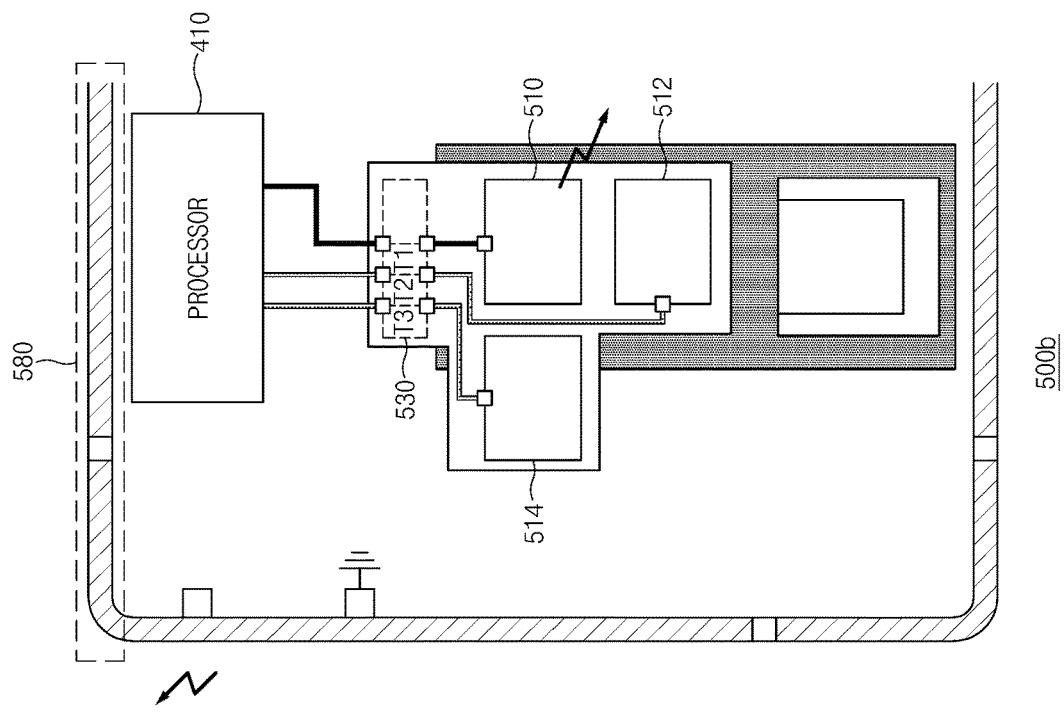
FIG. 5B illustrates an antenna operation according to a horizontal mode and a vertical mode of an electronic device, according to an embodiment.
Figure 5B:
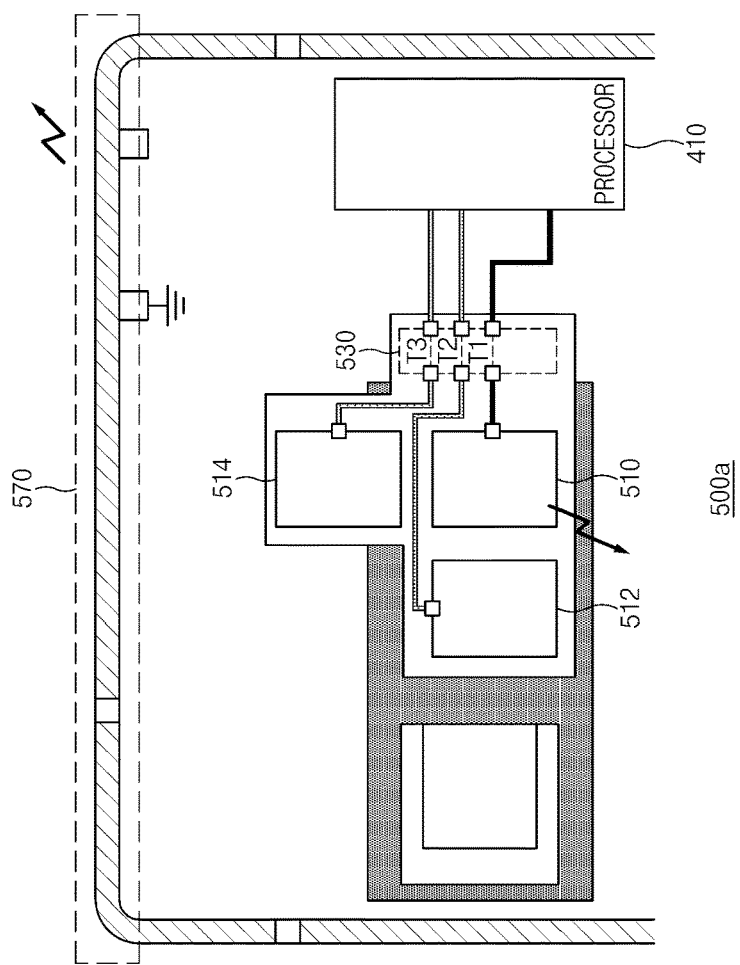

Referring to FIG. 5, an electronic device 400 includes a processor 410, a plurality of patch antennas including a first patch antenna 510, a second patch antenna 512, a third patch antenna 514, and a metal antenna 520.

As shown in FIG. 5, the electronic device 400 includes a switching terminal 530. The switching terminal 530 may electrically connect the first patch antenna 510, the second patch antenna 512, and the third patch antenna 514 with a processor 410. The switching terminal 530 may turn on/off signal transmission between the first patch antenna 510, the second patch antenna 512, and the third patch antenna 514, and the processor 410. In addition, in separate embodiments, some of the aforementioned components may be excluded from the electronic device 400.

The metal antenna 520 may be included in a housing of the electronic device 400. The housing may be understood as a structure including components of the electronic device 400. The metal antenna 520 may transmit and receive a signal of a specified frequency band. The metal antenna 520 may operate as an antenna radiator which transmits and/or receives a radio frequency (RF) signal of the same frequency band (e.g., a UWB frequency band) as the first antenna 510, the second antenna 512, and/or the third antenna 514. The metal antenna 520 may be spaced apart from another structure by a slit 540 to prevent signal interference from another structure. The metal antenna 520 may include a ground 550. The metal antenna 520 may be electrically connected with the processor 410.

The metal antenna 520 may be placed near or may include a conductive pattern and thus the conductive pattern may operate as an antenna radiator (e.g., a laser direct structuring (LDS) antenna). For example, the conductive pattern may operate an antenna radiator, which transmits and/or receives an RF signal of a UWB frequency band, to be substantially the same or similar to the first antenna 510 and/or the second antenna 512. The conductive pattern may be designed to have an electrical length of "λ/4" of the above-mentioned RF signal. For example, when the frequency band of the RF signal is about 8 gigahertz (GHz), the length of the conductive pattern may be designed as about 9 mm to about 11 millimeters (mm), which is the electrical length of λ/4 of the RF signal.

The processor 410 may use the metal antenna 520 as an auxiliary antenna. The processor 410 may transmit a first positioning signal using at least one of the first subject 510, the second subject 512, and/or the third subject 514. The processor 410 may receive a signal for the first positioning signal using at least one of the first subject 510, the second subject 512, and/or the third subject 514. When the strength of the received signal is less than a threshold, the processor 410 may operate in an assistance mode. The processor 410 may use the metal antenna 520 as the auxiliary antenna in the assistance mode. The processor 410 may transmit a second positioning signal using at least one of the first subject 510, the second subject 512, and/or the third subject 514. The processor 410 may receive a signal for the second positioning signal using at least one of the first subject 510, the second subject 512, and/or the third subject 514 and may identify an arrival time point based on the received signal. The processor 410 may receive the signal for the second positioning signal using the metal antenna 520 and may correct the identified arrival time point based on the signal received using the metal antenna 520. The processor 410 may determine the corrected arrival time point as an arrival time point of the second positioning signal and may perform positioning using the determined arrival time point.

FIG. 5B illustrates an antenna operation according to a horizontal mode and a vertical mode of an electronic device, according to an embodiment.

Reference numerals corresponding to FIG. 5A among reference numerals of FIG. 5B may be referred to by the description of FIG. 5A.

Referring to FIG. 5B, a processor 410 may perform positioning using a plurality of patch antennas including the first patch antenna 510, the second patch antenna 512, and the third patch antenna 514. The processor 410 may use one of the first patch antenna 510, the second patch antenna 512, or the third patch antenna 514 as an auxiliary antenna based on a form where the electronic device 400 is used.

The electronic device 400 may be used in a horizontal mode (e.g., a landscape mode) or a vertical mode (e.g., a portrait mode). The processor 410 may detect a state where the electronic device 400 is used using at least one sensor (e.g., a gyro sensor). The horizontal mode may be referred to when a user horizontally holds and uses the electronic device 400, and the vertical mode may be referred to when the user vertically holds and uses the electronic device 400.

Reference numeral 500a illustrates a case in which the electronic device 400 is used in the vertical mode. When the electronic device 400 is in the vertical mode, the processor 410 may perform positioning using the first patch antenna 510 and the second patch antenna 512 parallel to a short surface 570 of a housing of the electronic device 400. A metal antenna 520 may be formed in at least a portion of the short surface 570 of the housing of the electronic device 400. The processor 410 may perform positioning using the first patch antenna 510 and the second patch antenna 512 parallel to the short surface 570 of the housing of the electronic device 400, thus preventing antenna performance from being degraded due to the holding of the user and distinguishing between the left of a positioning target and the right of the positioning target. The processor 410 may use the third antenna 514 as an auxiliary antenna to improve accuracy of positioning in an assistance mode. The processor 410 may be electrically connected with the second antenna 512 and the third antenna 514 via a switching terminal 530.

When performing positioning using the first patch antenna 510 and the second patch antenna 512, the processor 410 may be electrically connected with the second antenna 512 by the switching terminal 530 and may be electrically disconnected from the third antenna 514 by the switching terminal 530. When using the third antenna 514 as an auxiliary antenna to correct an arrival time point, the processor 410 may be electrically disconnected from the second antenna 512 by the switching terminal 530 and may be electrically connected with the third antenna 514 by the switching terminal 530. Unlike reference numeral 500a, the electronic device 400 may fail to include the switching terminal 530. The processor 410 may control the first antenna 510, the second antenna 512, and the third antenna 514 without switching to perform positioning. In this case, a timing error due to the switching may be reduced. For example, the processor 410 may receive a signal for the positioning signal using the first antenna 510, the second antenna 512, and the third antenna 514, and may correct an arrival time point identified using the first antenna 510 and the second antenna 512 by using the third antenna 514 as an auxiliary antenna.

Reference numeral 500b illustrates a case in which the electronic device 400 is used in the horizontal mode. When the electronic device 400 is in the horizontal mode, the processor 410 may perform positioning using two patch antennas including the first antenna 510 and the third antenna 514 parallel to a long surface 580 of the housing of the electronic device 400. The metal antenna 520 may be formed in at least a portion of the long surface 580 of the housing of the electronic device 400. The processor 410 may perform positioning using two patch antennas including the first antenna 510 and the second antenna 512 parallel to the long surface 580 of the housing of the electronic device 400, thus preventing antenna performance from being degraded due to the manner in which the user holds the electronic device, and distinguishing between the left of a positioning target and the right of the positioning target. The processor 410 may use the second antenna 512 as an auxiliary antenna to improve accuracy of positioning in the assistance mode. The processor 410 may be electrically connected with the second antenna 512 and the third antenna 514 via the switching terminal 530. When performing positioning using two patch antennas including the first antenna 510 and the third antenna 514, the processor 410 may be electrically connected with the third antenna 514 by the switching terminal 530 and may be electrically disconnected from the second antenna 512 by the switching terminal 530. When using the second antenna 512 as the auxiliary antenna to correct an arrival time point, the processor 410 may be electrically disconnected from the second antenna 512 by the switching terminal 530 and may be electrically connected with the third antenna 514 by the switching terminal 530.

In another embodiment, the electronic device 400 may not include the switching terminal 530. The processor 410 may control the plurality of patch antennas including the first antenna 510, the second antenna 512, and the third antenna 514 without switching to perform positioning. In this case, a timing error due to the switching may be reduced. The processor 410 may receive a signal for the positioning signal using the plurality of patch antennas including the first antenna 510, the second antenna 512, and the third antenna 514, and may correct an arrival time point identified using the first antenna 510 and the third antenna 514 by using the second antenna 512 as the auxiliary antenna.

Figure 6:
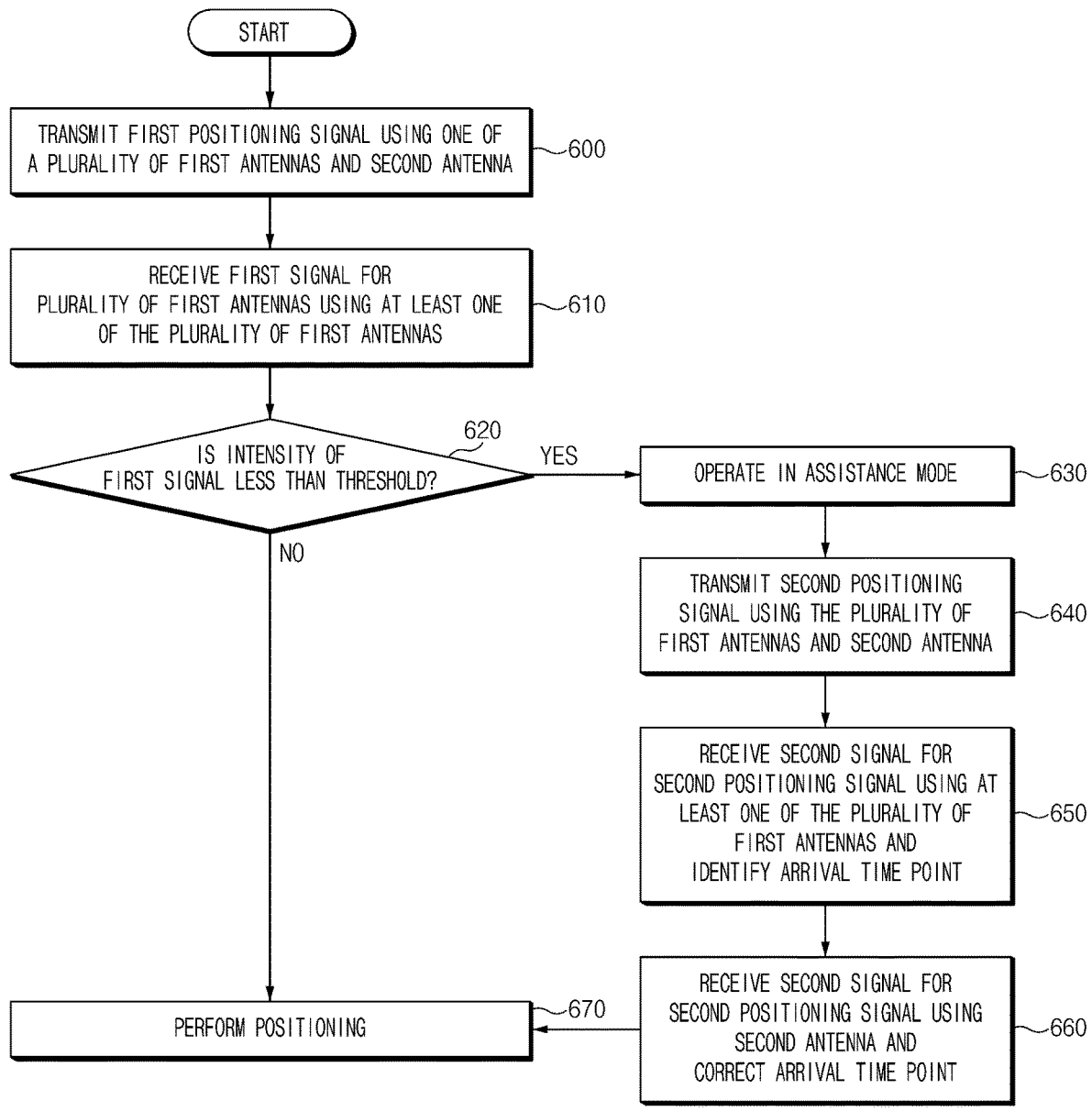
FIG. 6 is a flowchart illustrating positioning of an electronic device, according to an embodiment.

FIG. 6 is a flowchart illustrating positioning of an electronic device, according to an embodiment.

Referring to FIG. 6, in step 600, a processor 410 transmits a first positioning signal using one of a plurality of first antennas (e.g., a plurality of patch antennas including the first antenna 510, the second antenna 512, and the third antenna 514) and a second antenna (e.g., a metal antenna 520) to perform positioning. The first positioning signal may include information about a transmission time point of the first positioning signal.

In step 610, the processor 410 receives a first signal for the first positioning signal using at least one of the plurality of first antennas.

In step 620, the processor 410 compares an intensity of the first signal with a threshold. When the intensity of the first signal is greater than or equal to the threshold (e.g., when a received signal strength indicator (RSSI)>−85 decibel milliwatts (dBm or when the first signal is in a strong electric field) (NO in step 620), the processor 410 proceeds to step 670. In step 670, the processor 410 determines an arrival time point of the first signal based on the first signal and performs positioning.

When the intensity of the first signal is less than the threshold (e.g., when RSSI>−85 dBm or when the first signal is in a weak electric field) (YES in step 620, the processor 410 proceeds to step 630. The weak electric field may be understood as, for example, when a polarization characteristic of an antenna of an electronic device 101 and a polarization characteristic of an antenna of an external electronic device are perpendicular to each other or when a positioning signal is interfered with by an obstacle between the electronic device 101 and the external electronic device. When the intensity of a receive signal is weak, as well as the above-mentioned example of the weak electric field situation, may be understood as the weak electric field situations.

In step 630, the processor 410 operates in an assistance mode to improve accuracy of positioning in the weak electric field environment. In the assistance mode, the processor 410 may use the second antenna as an auxiliary antenna.

In step 640, the processor 410 transmits a second signal using one of the plurality of first antennas or the second antenna.

In step 650, the processor 410 receives a second signal for the second positioning signal using at least one of the plurality of first antennas. The processor 410 may identify an arrival time point based on the second signal received using the at least one of the plurality of antennas.

In step 660, the processor 410 receives the second signal for the second positioning signal using the second antenna. The processor 410 may correct the identified arrival time point based on the second signal received using the second antenna. The processor 410 may correct first path search timing in the signal received using the plurality of first antennas based on the second signal received by the second antenna. The processor 410 may determine the corrected arrival time point as an arrival time point of the second signal.

In step 670, the processor 410 performs positioning using the determined arrival time point. A description of the positioning method is referenced in the description of FIG. 2.

The threshold (e.g., −85 dBm) of FIG. 6 is merely illustrative, and embodiments of the disclosure are not limited thereto. For example, the patch antenna and the metal antenna may differ in threshold numerical value. When the first antenna includes a metal antenna, the processor 410 may set a different threshold numerical value for determining whether there is a weak electric field environment.

Figure 7:
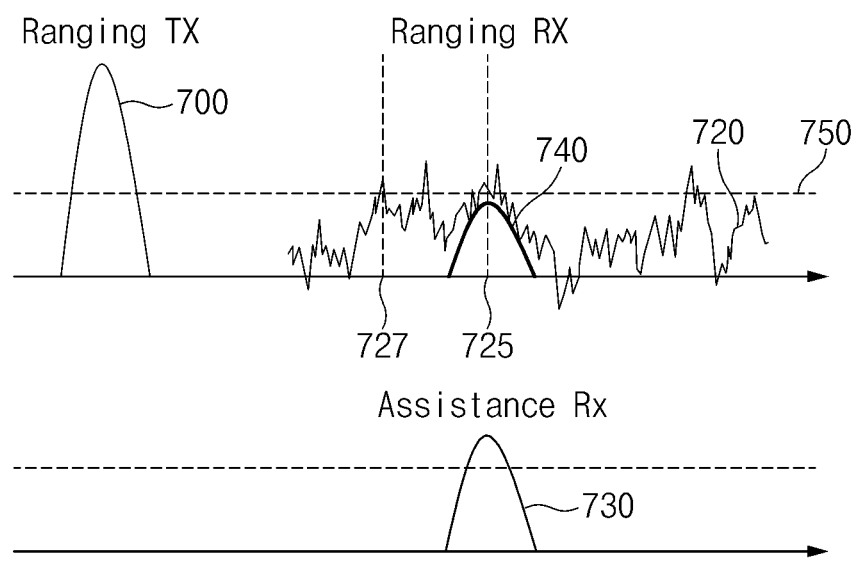
FIG. 7 illustrates performing positioning in an assistance mode of an electronic device, according to an embodiment.

FIG. 7 illustrates performing positioning in an assistance mode of an electronic device, according to an embodiment. A description of a second positioning signal 700 and a second signal 740 of FIG. 7 is referenced in the description of the second positioning signal and the second signal of FIG. 6.

Referring to FIG. 7, when operating in an assistance mode, a processor 410 may use a metal antenna 520 as an auxiliary antenna. The processor 410 may transmit the second positioning signal 700 using one of a plurality of patch antennas including the first antenna 510, the second antenna 512, and the third antenna 514.

In a weak electric field situation, the processor 410 may receive the second signal 740 for the second positioning signal 700 using at least one of the plurality of patch antennas including the first antenna 510, the second antenna 512, and the third antenna 514. In this case, the processor 410 may receive a noise signal 720 around an electronic device 400 together. It may be difficult for the processor 410 to determine an arrival time point 725 of the second signal 740 due to the noise signal 720.

For example, the intensity of the noise signal 720 may be greater than a threshold 750 at a time point in FIG. 7. The processor 410 may find a peak of the intensity of the noise signal 720 after the intensity of the noise signal 720 is greater than the threshold 750 and may determine the peak as a first path. In this case, the processor 410 may identify a specific time point 727 as an arrival time point and a distance from a positioning target may be measured shorter than it really is.

The processor 410 may receive the second signal for the second positioning signal 700 using the metal antenna 520. The processor 410 may correct the identified arrival time point based on the second signal received using the metal antenna 520. The second signal received using the metal antenna 520 by the processor 410 may be referred to as a signal 730. The signal 730 may include information associated with the arrival time point of the second signal. The processor 410 may correct timing for determining an arrival time point using the first antenna 510 based on an arrival time point of the signal 730. Using the above-mentioned method, the processor 410 may correct the identified arrival time point and may determine the corrected arrival time point as an arrival time point of the second signal 740.

The processor 410 may use at least one of the patch antennas including the first antenna 510, the second antenna 512, and the third antenna 514, rather than the metal antenna 520, as an auxiliary antenna. Various antenna operation methods for performing positioning will be described in detail with reference to FIGS. 8 to 10.

FIG. 8 is a table illustrating an antenna operation, according to an embodiment.

An electronic device 400 may perform positioning according to FIG. 6 using ANT 1 (e.g., one or more of the plurality of antennas including the first antenna 510, the second antenna 512, and the third antenna 514), ANT 2 (e.g., one or more of the plurality of antennas including the first antenna 510, the second antenna 512, and the third antenna 514), and ANT 0 (e.g., the metal antenna 520). A description of the positioning of the electronic device 400 is referenced by the description of FIG. 6.

Referring to FIG. 8, Table 800a illustrates an antenna operation upon ranging of the electronic device 400. The processor 400 may transmit a first positioning signal using ANT 1 and may receive a signal for the first positioning signal using ANT 1. When the intensity of the received signal is less than a threshold (e.g., when RSSI>−85 dBm), the processor 410 may use ANT 0 as an auxiliary antenna. The processor 410 may transmit a second positioning signal using ANT 1 and may receive a signal for the second positioning signal using ANT 1 to identify an arrival time point. The processor 410 may receive the signal for the second positioning signal using ANT 0 and may correct the identified arrival time point based on the received signal.

Table 800b illustrates an antenna operation upon ranging of the electronic device 400. Unlike Table 800a, the processor 410 may receive the signal for the first positioning signal and the signal for the second positioning signal using two or more antennas for ranging. Like Table 800a, the processor 410 may use ANT 0 as an auxiliary antenna. The processor 410 may more accurately measure a distance from a positioning target by using the two or more antennas.

Table 800c illustrates an antenna operation as a table upon AoA measurement of the electronic device 400. Unlike Table 800a, the processor 410 may receive the signal for the first positioning signal and the signal for the second positioning signal using two or more antennas for AoA measurement. Like Table 800a, the processor 410 may use ANT 0 as an auxiliary antenna.

FIG. 9 is a table illustrating an antenna operation upon ranging of an electronic device, according to an embodiment.

Table 900a illustrates an embodiment of using ANT 1 (e.g., one or more of the plurality of antennas including the first antenna 510, the second antenna 512, and the third antenna 514) as an auxiliary antenna upon ranging of an electronic device 400 as a table. A processor 410 may transmit a first positioning signal using ANT 0 and may receive a signal for the first positioning signal using ANT 0. When the intensity of the received signal is less than a threshold (e.g., when RSSI<−85 dBm), the processor 410 may use ANT 1 as an auxiliary antenna. The processor 410 may transmit a second positioning signal using ANT 0 and may receive a signal for the second positioning signal using ANT 0 to identify an arrival time point. The processor 410 may receive the signal for the second positioning signal using ANT 1 and may correct the identified arrival time point based on the received signal.

Table 900b illustrates an embodiment of using ANT 0 (e.g., the metal antenna 520) which is an auxiliary antenna as a transmit antenna of a positioning signal upon ranging of the electronic device 400 as a table. The processor 410 may transmit the first positioning signal using ANT 0 and may receive the signal for the first positioning signal using ANT 1. When the intensity of the received signal is less than a threshold (e.g., when RSSI<−85 dBm), the processor 410 may use ANT 0 as an auxiliary antenna. The processor 410 may transmit the second positioning signal using ANT 0 and may receive the signal for the second positioning signal using ANT 1 to identify an arrival time point. The processor 410 may receive the signal for the second positioning signal using ANT 0 and may correct the identified arrival time point based on the received signal.

FIG. 10 is a table illustrating an antenna operation upon AoA measurement of an electronic device, according to an embodiment.

Referring to FIG. 10, Table 1000a illustrates an embodiment of using ANT 1 (e.g., one or more of the plurality of antennas including the first antenna 510, the second antenna 512, and the third antenna 514) as an auxiliary antenna upon AoA measurement of an electronic device 400. A processor

410 may transmit a first positioning signal using ANT 0 and may receive a signal for the first positioning signal using ANT 0 and ANT 2. When the intensity of the received signal is less than a threshold (e.g., when RSSI<−85 dBm), the processor 410 may use ANT 1 as an auxiliary antenna. The processor 410 may transmit a second positioning signal using ANT 0 and may receive a signal for the second positioning signal using ANT 0 and ANT 2 to identify an arrival time point. The processor 410 may receive the signal for the second positioning signal using ANT 1 and may correct the identified arrival time point based on the received signal.

Table 1000*b* illustrates an embodiment of using ANT 0 (e.g., the metal antenna 520) which is an auxiliary antenna as a transmit antenna of a positioning signal upon AoA measurement of the electronic device 400. The processor 410 may transmit the first positioning signal using ANT 0 and may receive the signal for the first positioning signal using ANT 1 and ANT 2. When the intensity of the received signal is less than a threshold (e.g., when RSSI<−85 dBm), the processor 410 may use ANT 0 as an auxiliary antenna. The processor 410 may transmit the second positioning signal using ANT 0 and may receive the signal for the second positioning signal using ANT 1 and ANT 2 to identify an arrival time point. The processor 410 may receive the signal for the second positioning signal using ANT 0 and may correct the identified arrival time point based on the received signal.

Unlike 1000*b*, Table 1000*c* illustrates an embodiment of using ANT 1 which is an auxiliary antenna as a transmit antenna of a positioning signal upon AoA measurement of the electronic device 400 as a table.

The antenna operation methods of FIGS. 8 to 10 are merely illustrative, and embodiments of the disclosure are not limited thereto. For example, the electronic device 400 may further include a patch antenna (e.g., ANT 3). In addition, when performing positioning, the electronic device 400 may use all antennas included in the electronic device 400.

Figure 11:
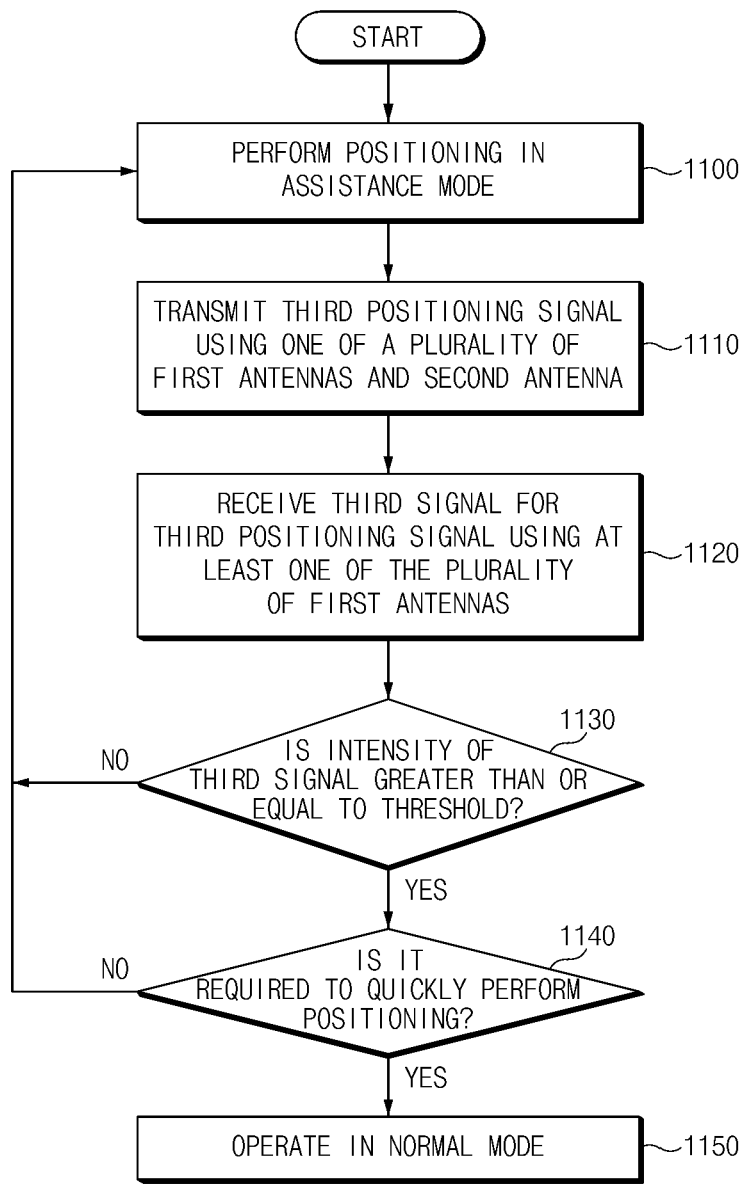
FIG. 11 is a flowchart illustrating positioning of an electronic device which performs positioning in an assistance mode, according to an embodiment.

FIG. 11 is a flowchart illustrating positioning of an electronic device which performs positioning in an assistance mode, according to an embodiment. FIG. 11 illustrates an operation after positioning according to FIG. 6 is performed.

Referring to FIG. 11, in step 1100, a processor 410 performs positioning in an assistance mode. A description of performing the positioning in the assistance mode is referenced by the description of the flowchart of FIG. 6.

In step 1110, the processor 410 transmits a third positioning signal using one of a plurality of antennas (e.g., one or more of the plurality of antennas including the first antenna 510, the second antenna 512, and the third antenna 514) or a second antenna (e.g., the metal antenna 520).

In step 1120, the processor 410 receives a third signal for the third positioning signal using at least one of the plurality of first antennas.

In step 1130, the processor 410 compares the intensity of the third signal with a threshold. For example, when the intensity of the signal for the third positioning signal is less than the threshold (e.g., when RSS<−85 dBm), returning to step 1100, the processor 410 performs positioning in an assistance mode (NO in step 1130). For example, when the intensity of the signal for the third positioning signal is greater than or equal to the threshold (e.g., when RSSI≥−85 dBm), the processor 410 proceeds to step 1140 (YES in step 1130).

In step 1140, the processor 410 determines whether quickly performing positioning is required. For example, when an electronic device 400 is mounted on a vehicle and when the vehicle travels above a specified speed, the electronic device 400 needs to quickly measure a distance between the vehicle and a positioning target (e.g., a pedestrian). In this case, the processor 410 may determine quickly performing the positioning is required. When quickly performing the positioning is not required in step 1140 (NO in step 1140), returning to step 1100, the processor 410 performs positioning in an assistance mode. When quickly performing the positioning is required in step 1140 (YES in step 1140), the processor 410 proceeds to step 1150.

In step 1150, the processor 410 operates in a normal mode. The normal mode may be understood as an operation mode where the processor 410 performs positioning without using an auxiliary antenna (e.g., a second antenna). Precision of positioning may be more degraded in the normal mode than in the assistance mode. A description of performing the positioning in the normal mode is referenced by the description of the FIG. 3.

Figure 12A:
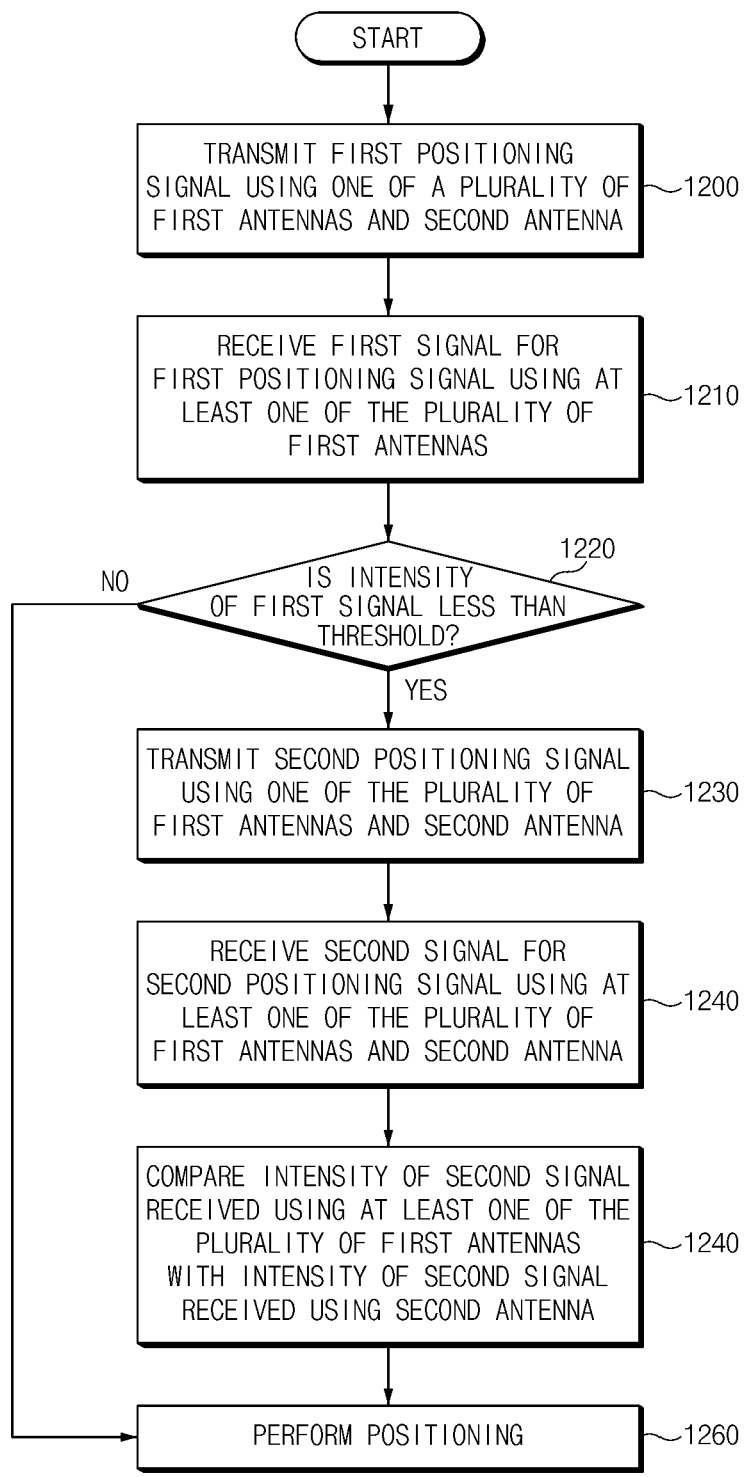
FIG. 12A is a flowchart illustrating performing stepwise positioning in a weak electric field environment, according to an embodiment.

FIG. 12A is a flowchart illustrating performing stepwise positioning in a weak electric field environment, according to an embodiment.

Referring to FIG. 12A, in step 1200, a processor 410 transmits a first positioning signal using one of a plurality of first antennas (e.g., one or more of the plurality of antennas including the first antenna 510, the second antenna 512, and the third antenna 514) and a second antenna (e.g., the metal antenna 520). The first positioning signal may include information about a transmission time point of the first positioning signal.

In step 1210, the processor 410 receives a first signal for the first positioning signal using at least one of the plurality of first antennas.

In step 1220, the processor 410 compares an intensity of the first signal received using the plurality of antennas with a threshold. When the intensity of the first signal is greater than or equal to the threshold (e.g., when an RSSI≥−85 dBm), the processor 410 proceeds to step 1260 to perform positioning using the plurality of first antennas (NO in step 1220). When the intensity of the first signal is less than the threshold (e.g., when RSSI<−85 dBm), the processor 410 proceeds to step 1230 (YES in step 1220).

In step 1230, the processor 410 transmits a second positioning signal using one of the plurality of first antennas or the second antenna.

In step 1240, the processor 410 receives a second signal for the second positioning signal using at least one of the plurality of first antennas and the second antenna.

In step 1250, the processor 410 compares the intensity of the second signal received using the at least one of the plurality of first antennas with the intensity of the second signal received using the second antenna. The processor 410 may select an antenna, the intensity of a received signal of which is strong. For example, when the intensity of the second signal received using the at least one of the plurality of first antennas is stronger than the intensity of the second signal received using the second antenna, the processor 410 may determine an arrival time point of the second signal based on the second signal received using the at least one of the plurality of first antennas. When the intensity of the second signal received using the second antenna is stronger than the intensity of the second signal received using the at least one of the plurality of first antennas, the processor 410 may determine an arrival time point of the second signal based on the second signal received using the second antenna. The processor 410 may select an antenna (e.g., the first antenna), the intensity of the received signal of which is strong, and may use an antenna (e.g., the second antenna), the intensity of the received signal of which is weak, as an auxiliary antenna.

In step 1260, the processor 410 performs positioning using the antenna selected in step 1250. For example, the processor 410 may measure a distance from a positioning target and/or an AoA based on the arrival time point determined using the selected antenna (e.g., the first antenna). In addition, the processor 410 may use the antenna (e.g., the second antenna), the intensity of the received signal of which is weak, as the auxiliary antenna. The processor 410 may identify an arrival time point using the selected antenna (e.g., the first antenna) and may correct the identified arrival time point using the auxiliary antenna (e.g., the second antenna).

Figure 12B:
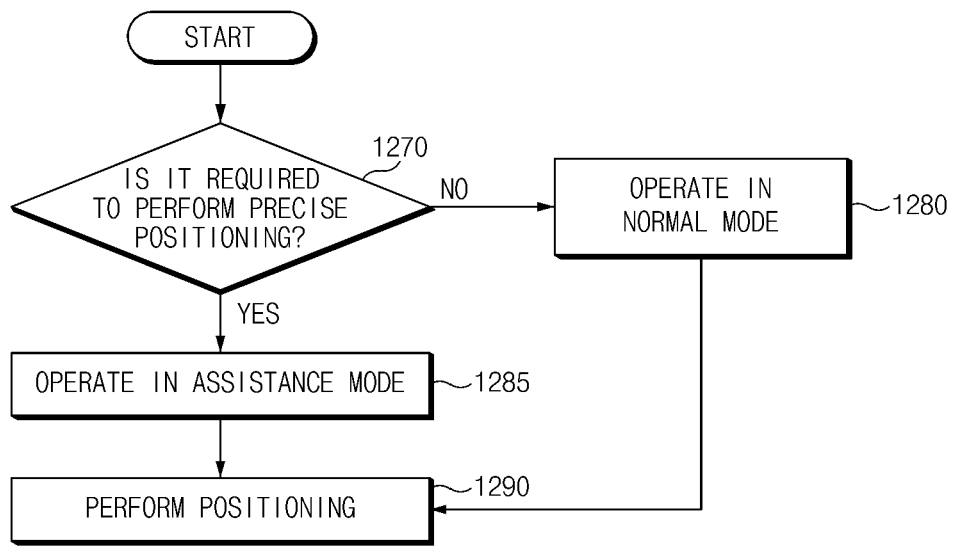
FIG. 12B is a flowchart illustrating performing positioning of an electronic device which operates in an assistance mode in a specified condition, according to an embodiment.

FIG. 12B is a flowchart illustrating performing positioning of an electronic device which operates in an assistance mode in a specified condition, according to an embodiment.

Referring to step 1270, a processor 410 determines whether performing precise positioning is required. For example, when an electronic device 400 needs to precisely identify a distance from a positioning target and/or an AoA and perform a specific operation, the processor 410 may determine that performing precise positioning is required.

When it is determined that performing precise positioning is not required in step 1270 (NO in step 1270), the processor 410 proceeds to step 1280. In step 1280, the processor 410 operates in a normal mode. In step 1290, the processor 410 may performs positioning according to the flowchart of FIG. 6. For example, the processor 410 may receive a signal for a positioning signal using at least one of a plurality of first antennas (e.g., one or more of the plurality of antennas including the first antenna 510, the second antenna 512, and the third antenna 514). When the signal received using the at least one of the plurality of first antennas is less than a threshold, that is, in a weak electric field situation, the processor 410 operates in an assistance mode according to step 630 of FIG. 6. In addition, when the signal received using the at least one of the plurality of first antennas is greater than or equal to the threshold, the processor 410 may determine an arrival time point based on the signal received using the at least one of the plurality of first antennas and may perform positioning based on the determined arrival time point.

When it is determined that performing precise positioning is required in step 1270 (YES in step 1270), the processor 410 proceeds to step 1285. In step 1285, the processor 410 operates in an assistance mode. In step 1290, the processor 410 performs positioning according to the assistance mode. A description of the assistance mode is described by the description of the assistance mode of FIG. 6. Herein, unlike FIG. 6, when a specified condition is met, although the processor 410 is in a weak electric field situation or a strong electric field situation in steps 1285 and 1290, the processor 410 may correct the identified arrival time point using a second antenna (e.g., the metal antenna 520). The specified condition may be understood as, for example, when the electronic device 400 provides an augmented reality (AR) environment or is sharing data with an external electronic device 101. The processor 410 may determine the corrected arrival time point as an arrival time point of a signal for a positioning signal and may perform positioning based on the determined arrival time point.

Figure 13:
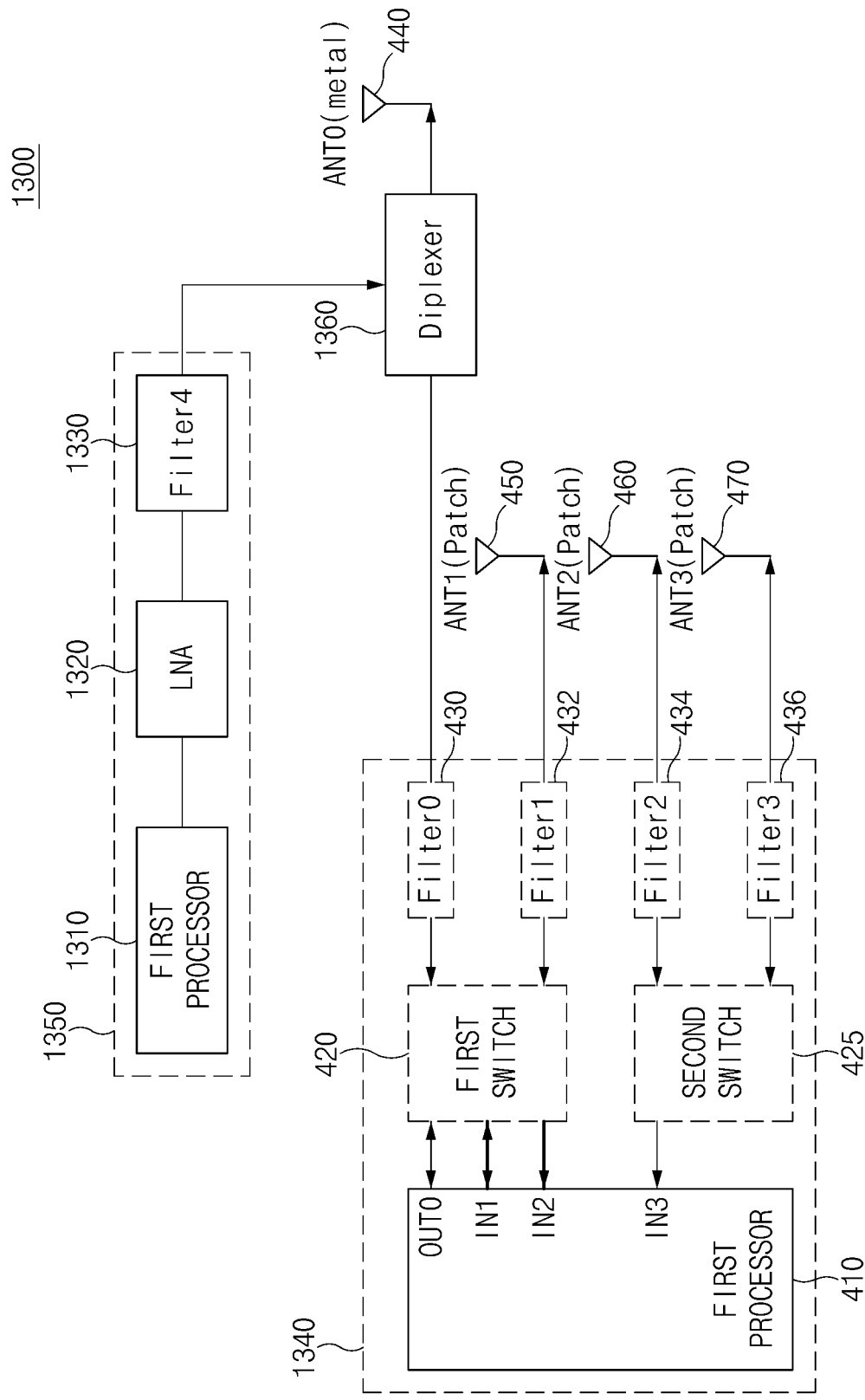
FIG. 13 is a block diagram illustrating an electronic device in which a metal antenna for UWB is merged and designed, according to an embodiment.

FIG. 13 is a block diagram illustrating an electronic device in which a metal antenna for UWB is merged and designed, according to an embodiment. For convenience of description, descriptions of components of FIG. 13 corresponding to reference numerals of FIG. 4 may be omitted.

A metal antenna used for UWB may be merged and designed with a metal antenna structure for data communication. Because an antenna for UWB should have a high band (HB) frequency characteristic, when an antenna for data communication meets HB performance, it is possible to merge and design a metal antenna according to FIG. 13.

Referring to FIG. 13, an electronic device 1300 in which the metal antenna is merged and designed includes first wireless communication circuitry 1340, second wireless communication circuitry 1350, a plurality of patch antennas including a first antenna 450, a second antenna 460, a third antenna 470, a metal antenna 440, and/or a diplexer 1360.

The first wireless communication circuitry 1340 includes a first processor 410, a first switch 420, a second switch 425, a first filter 430, a second filter 432, a third filter 434, and a fourth filter 436. A description of the components of the first wireless communication circuitry 1340 may be referred to by the description of FIG. 4.

The second wireless communication circuitry 1350 includes a second processor 1310, a low noise amplifier (LNA) 1320, and/or a filter 1330.

The first processor 410 and the second processor 1310 may be referred to as at least one processor. The components of FIG. 13 are merely illustrative, and embodiments of the disclosure are not limited thereto. For example, at least one processor may be implemented independently of the first wireless communication circuitry 1340 and/or the second wireless communication circuitry 1350. At least one processor (e.g., a CP) may be implemented with a main processor 121 on one chip or may be implemented independently of the main processor.

The first wireless communication circuitry 1340 and the second wireless communication circuitry 1350 may be operatively connected with the diplexer 1360. The diplexer 1360 may be operatively connected with the metal antenna 440.

The second wireless communication circuitry 1350 may deliver a signal for data communication to the metal antenna 440 or may receive a signal for data communication, which is received by the metal antenna 440, from the metal antenna 440. For example, the second wireless communication circuitry 1350 may identify and authenticate the electronic device 1300 in a communication network, such as a first network 198 or a second network 199, using subscriber information (e.g., international mobile subscriber identifier (IMSI)) stored in a subscriber identification module 196.

The diplexer 1360 may separate a signal for data communication from a UWB signal. The first processor 410 may perform positioning using the UWB signal. The second processor 1310 may perform data communication using the signal for data communication.

When receiving data, the metal antenna 440 may receive a signal associated with data communication. For example, the signal associated with the data communication may include a signal of a frequency band for long term evolution (LTE) communication. The signal received by the metal antenna 440 may be delivered to the diplexer 1360 to be divided into a signal for data communication and a UWB signal. In detail, the signal for data communication and the UWB signal may be divided without interference therebetween by the diplexer 1360. The signal for data communication may be filtered through the filter 1330 and may be amplified through the LNA 1320. The signal passing through the LNA 1320 may be delivered to the second processor 1310. The second processor 1310 may perform data communication using the received signal.

Figure 14:
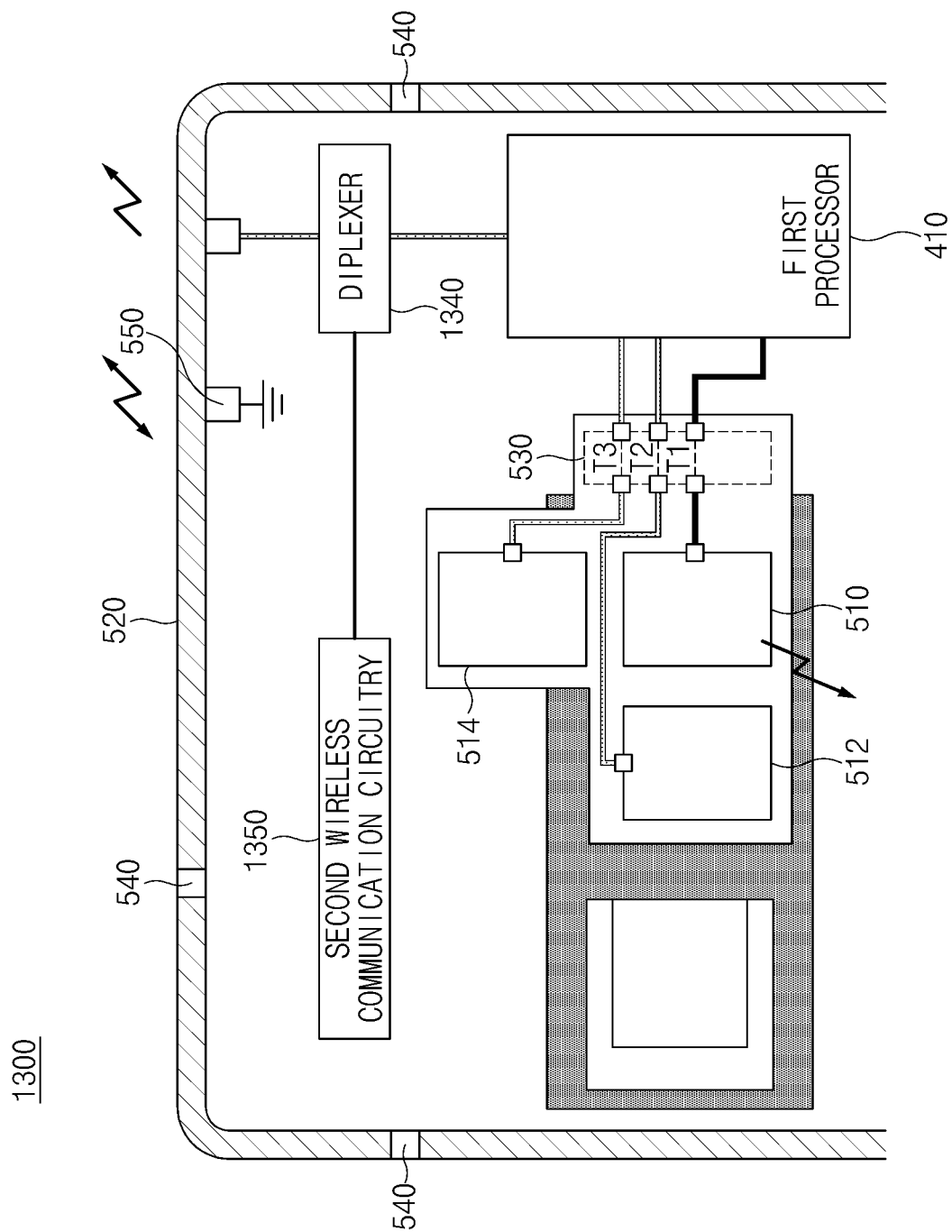
FIG. 14 illustrates a structure of an electronic device in which a metal antenna for UWB is merged and designed, according to an embodiment.

FIG. 14 illustrates a structure of an electronic device in which a metal antennas for UWB is merged and designed, according to an embodiment.

For convenience of description, descriptions of components corresponding to reference numerals of FIGS. 5A and 13 among reference numerals of FIG. 14 may be omitted.

When a metal antenna for data communication meets HB performance, it is possible to merge and design the metal antenna according to FIG. 14. Compared to the electronic device 400 of FIG. 5A, the merged and designed electronic device 1300 may further include a diplexer 1360 and/or second wireless communication circuitry 1350.

Referring to FIG. 14, at least one processor may improve precision of positioning by using a metal antenna 520 as an auxiliary antenna. The at least one processor may perform data communication using the second wireless communication circuitry 1350. When the at least one processor transmits and receives a signal for performing data communication and positioning using the metal antenna 520, the diplexer 1360 may divide a signal received by the metal antenna 520 into a signal for data communication and a UWB signal. The divided UWB signal and the divided signal for data communication may be respectively delivered to the first wireless communication circuitry 1340 and the second wireless communication circuitry 1350 to be processed by the at least one processor.

According to embodiments of the disclosure, the electronic device may improve precision of positioning by correcting an arrival time point of a signal received by an antenna using an auxiliary antenna in a weak electric field environment.

According to embodiments of the disclosure, the electronic device may perform precise positioning using an auxiliary antenna in an environment where high positioning precision is required.

In addition, various effects ascertained directly or indirectly through the disclosure may be provided.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
a housing;
a first communication circuit;
a second communication circuit different from the first communication circuit;
a plurality of first antennas including patch antennas electrically connected the first communication circuit; and
a second antenna including a metal antenna formed in at least a portion of the housing, the second antenna electrically connected to the first communication circuit and the second communication circuit,
wherein the first communication circuit is configured to:
  transmit a first positioning signal using the second antenna or one of the plurality of first antennas;
  receive a first reception signal using at least one of the plurality of first antennas, the first reception signal transmitted from a positioning target in response to the first positioning signal;
  transmit a second positioning signal using the second antenna or one of the plurality of first antennas, when an intensity of the first reception signal is less than a threshold;
  receive a second reception signal using at least one of the plurality of first antennas, the second reception signal transmitted from the positioning target in response to the second positioning signal;
  receive a third reception signal using the second antenna, the third reception signal transmitted from the positioning target in response to the second positioning signal; and
  determine a distance and an angle of arrival of the positioning target based on the second reception signal and the third reception signal.

2. The electronic device of claim 1, wherein the first communication circuit is further configured to:
  determine an arrival time point of a reception signal from the positioning target based on the third reception signal; and
  determine the distance from the positioning target based on the determined arrival time point of the reception signal.

3. The electronic device of claim 2, wherein the first communication circuit is further configured to:
  determine the arrival of angle (AoA) with the positioning target based on the determined arrival time point of the reception signal.

4. The electronic device of claim 1, wherein the first communication circuit is further configured to:
  compare an intensity of the second reception signal with an intensity of the third reception signal,
  determine an arrival time point of a reception signal from the positioning target based on the second reception signal, when the intensity of the second reception signal is stronger than the intensity of the third reception signal, and
  determine an arrival time point of a reception signal from the positioning target based on the third reception signal, when the intensity of the third reception signal is stronger than the intensity of the second reception signal.

5. The electronic device of claim 1, further comprising:
a diplexer, wherein the second antenna electrically connected to the first communication circuit and the second communication circuit through the diplexer, and
wherein the diplexer is configured to divide a signal received by the second antenna into a positioning signal for the first communication circuit and a data communication signal for the second communication circuit.

6. The electronic device of claim 1, wherein the first communication circuit is further configured to:
  transmit a third positioning signal using the second antenna or one of the plurality of first antennas;
  receive a fourth reception signal using at least one of the plurality of first antennas, the fourth reception signal transmitted from the positioning target in response to the third positioning signal; and
  determine an arrival time point based on the fourth reception signal, when an intensity of the fourth reception signal is greater than or equal to the threshold and when a specified condition is met.

7. The electronic device of claim 6, wherein the electronic device is included in a vehicle, the electronic device further comprising:

at least one sensor, wherein the first communication circuit is further configured to:

detect a speed of the vehicle using the at least one sensor, and determine that the specified condition is met, when the detected speed of the vehicle is greater than a predetermined speed.

8. The electronic device of claim 1, wherein the first communication circuit is further configured to:

transmit a third positioning signal using the second antenna or one of the plurality of first antennas, when a specified condition is met;

receive a fourth reception signal using at least one of the plurality of first antennas, the fourth reception signal transmitted from the positioning target in response to the third positioning signal;

receive a fifth reception signal using the second antenna, the fifth reception signal transmitted from the positioning target in response to the third positioning signal; and determine the distance and the angle of arrival of the positioning target based on the fourth reception signal and the fifth reception signal.

9. An operation method of an electronic device, the operation method comprising:

transmitting a first positioning signal using one of a plurality of first antennas or using a second antenna, the plurality of first antennas including patch antennas and electrically connected to a first communication circuit, the second antenna including a metal antenna formed in at least a portion of a housing of the electronic device and electrically connected to the first communication circuit and a second communication circuit different from the first communication circuit;

receiving a first reception signal using at least one of the plurality of first antennas, the first reception signal transmitted from a positioning target in response to the first positioning signal;

transmitting a second positioning signal using one of the plurality of first antennas or using the second antenna, when an intensity of the first reception signal is less than a threshold;

receiving a second reception signal using at least one of the plurality of first antennas, the second reception signal transmitted from the positioning target in response to the second positioning signal;

receiving a third reception signal using the second antenna, the third reception signal transmitted from the positioning target in response to the second positioning signal; and determining a distance and an angle of arrival of the positioning target based on the second reception signal and the third reception signal.

10. The operation method of claim 9, further comprising:

determining an arrival time point of a reception signal from the positioning target based on the third reception signal; and determine the distance from the positioning target based on the determined arrival time point of the reception signal.

11. The operation method of claim 10, further comprising:

determining the arrival of angle (AoA) with the positioning target based on the determined arrival time point of the reception signal.

12. The operation method of claim 9, further comprising:

comparing an intensity of the second reception signal with an intensity of the third reception signal;

determining an arrival time point of a reception signal from the positioning target based on the second reception signal, when the intensity of the second signal reception is stronger than the intensity of the third reception signal; and determining an arrival time point of a reception signal from the positioning target based on the third reception signal, when the intensity of the third reception signal is stronger than the intensity of the second reception signal.

13. The operation method of claim 9, further comprising:

dividing, by a diplexer, a signal received by the second antenna into a positioning signal for the first communication circuit and a data communication signal for the second communication; and wherein the second antenna is electrically connected to the first communication circuit and the second communication circuit through the diplexer.

14. The operation method of claim 9, further comprising:

transmitting a third positioning signal using one of the plurality of first antennas or using the second antenna;

receiving a fourth reception signal using at least one of the plurality of first antennas, the fourth reception signal transmitted from the positioning target in response to the third positioning signal; and determining an arrival time point based on the fourth reception signal, when an intensity of the fourth reception signal is greater than or equal to the threshold and when a specified condition is met.

15. The operation method of claim 14, wherein the electronic device is included in a vehicle, the operating method further comprising:

detecting a speed of the vehicle; and determining that the specified condition is met, when the detected speed of the vehicle is greater than a predetermined speed.

16. The operation method of claim 9, further comprising:

transmitting a third positioning signal using one of the plurality of first antennas or using the second antenna, when a specified condition is met;

receiving a fourth reception signal using at least one of the plurality of first antennas, the fourth reception signal transmitted from the positioning target in response to the third positioning signal;

receiving a fifth reception signal using the second antenna, the fifth reception signal transmitted from the positioning target in response to the third positioning signal; and determining the distance and the angle of arrival of the positioning target based on the fourth reception signal and the fifth reception signal.

* * * * *